United States Patent
Nichols et al.

[11] Patent Number: 5,691,726
[45] Date of Patent: *Nov. 25, 1997

[54] GPS/RADIO ANTENNA COMBINATION

[75] Inventors: Mark E. Nichols, Sunnyvale; Eric B. Rodal, Morgan Hill, both of Calif.

[73] Assignee: Trimble Navigation Limited, Sunnyvale, Calif.

[*] Notice: The term of this patent shall not extend beyond the expiration date of Pat. No. 5,654,717.

[21] Appl. No.: 710,670

[22] Filed: Sep. 23, 1996

Related U.S. Application Data

[62] Division of Ser. No. 510,840, Aug. 3, 1995, Pat. No. 5,654,717.
[51] Int. Cl.$^6$ .................. H04B 7/185; G01S 5/02
[52] U.S. Cl. ........................ 342/357; 343/700 MS
[58] Field of Search ................ 342/357; 343/700 MS

[56] References Cited

U.S. PATENT DOCUMENTS

| | | | |
|---|---|---|---|
| 3,984,834 | 10/1976 | Kaloi | 343/700 |
| 5,099,249 | 3/1992 | Seavey | 343/700 MS |
| 5,272,485 | 12/1993 | Mason et al. | 343/700 |
| 5,300,936 | 4/1994 | Izadian | 343/700 MS |
| 5,486,836 | 1/1996 | Kuffner et al. | 343/700 MS |
| 5,523,761 | 6/1996 | Gildea | 342/357 |

*Primary Examiner*—Theodore M. Blum
*Attorney, Agent, or Firm*—David R. Gildea

[57] ABSTRACT

A GPS/radio antenna for receiving a GPS satellite signal and a DGPS radio signal. The GPS/radio antenna includes a GPS antenna using a microstrip antenna element for receiving the GPS signal having GPS location determination information, a radio antenna for receiving a DGPS radio signal in the FM broadcast frequency range having DGPS corrections, an enclosure, and a cable. The GPS/radio antenna may be included in a GPS/DGPS receiver system also including a receiver unit with an FM DGPS receiver for demodulating the DGPS radio signal and providing DGPS corrections, and a differential-ready GPS receiver for providing a differentially-corrected GPS location.

13 Claims, 5 Drawing Sheets

GPS/RADIO ANTENNA COMBINATION

DIVISIONAL APPLICATION

This application is a division of application Ser. No. 08/510,840, filed Aug. 3, 1995, now U.S. Pat. No. 5,654,717.

BACKGROUND OF THE INVENTION

1. Field of the Invention

The invention relates generally to radio antennas and more specifically to an antenna combination for receiving a Global Positioning System (GPS) signal and a radio signal having differential GPS (DGPS) correction information.

2. Description of the Prior Art

Global Positioning System (GPS) receivers are commonly used for navigation and precise positioning. The GPS receivers include a GPS antenna to receive a GPS signal having location determination information from one or more GPS satellites and a receiver unit to process the information and provide a GPS-derived location to a user. The GPS signal includes two codes—a P-Y code that is only available to agencies authorized by the United States Military Services and a C/A code that is available to all users. The inherent accuracy of the C/A code is about twenty meters. However, at the present time the United States Government degrades the location determination information in the C/A code with selective availability (SA) so that the accuracy for most users is currently about one hundred meters. Unfortunately, twenty to one hundred meters location accuracy is insufficient for precise positioning applications. Such applications require an accuracy in a range of less than a centimeter for boundary surveying to a few meters for geographical information systems.

Several differential GPS (DGPS) systems exist or have been proposed for improving the accuracy of the GPS-derived location by using differential GPS (DGPS) corrections. These systems include a reference GPS receiver located at a known location to compute the DGPS corrections by comparing the GPS location determination information to information representing the known location; and a differential-ready GPS receiver system, at a site whose location is to be determined, to apply the DGPS corrections to the GPS location determination information and provide a differentially corrected GPS (DGPS)-derived location. When the reference and the differential-ready GPS receivers are located within a few hundred kilometers and receive some of the same GPS satellite signals at the same time, the DGPS corrections can be used to correct the inherent or the SA-degraded accuracy to a range of less than a meter to a few meters.

The DGPS corrections are available in FM radio signals broadcasted from various stations at frequencies in a range of 88 to 108 MHz. In order to provide the DGPS location in real time, the differential-ready GPS receiver includes a radio antenna to receive the FM radio signal and an FM DGPS radio receiver to demodulate the signal and provide the DGPS corrections. For convenience in mobile applications, for low cost, and for a clear reception path to receive the FM radio signal, it is desirable for the radio antenna to be packaged with the GPS antenna as a GPS/radio antenna combination and to use a single cable to connect to the receiver unit. However, existing radio antennas for receiving FM radio signals are packaged separately and use a separate cable or are integrated into an FM receiver unit.

A difficulty in producing a GPS/radio antenna combination is that the electronics and mechanical structure for receiving the FM radio signal tend to interfere with the performance of the GPS antenna for receiving the GPS signal. One solution to this difficulty is disclosed in U.S. patent application Ser. No. 08/354617 for a "Dual Mode Vertical Antenna" by Rodal. However, the vertical GPS antenna disclosed by Rodal is not circularly polarized. Without circular polarization, the GPS antenna is more susceptible to multipath GPS signals that reduce the accuracy of the differentially-corrected GPS (DGPS) location.

There is a need for a GPS/radio antenna in a single package using a single output cable that combines a GPS antenna having circular polarization for receiving GPS satellite signals and a radio antenna for receiving a radio signal having DGPS corrections. There is a further need for a GPS receiver system, using such a GPS/radio antenna, for providing a differentially-corrected GPS (DGPS) location.

SUMMARY OF THE INVENTION

It is therefore an object of the present invention to provide a GPS/radio antenna combination for receiving a GPS signal and a radio signal.

Another object of the present invention is to provide a GPS/radio antenna for receiving a radio signal at frequencies in a range of about 88 MHz to 108 MHz.

Another object of the present invention is to provide a GPS/radio antenna for receiving a GPS signal with circular polarization.

Another object of the present invention is to provide a GPS/DGPS receiver system using a GPS/radio antenna combination for receiving GPS satellite signals including GPS location determination information and DGPS radio signals including DGPS corrections and providing a differentially-corrected GPS (DGPS) location.

Briefly, a preferred embodiment of the GPS/radio antenna of the present invention includes a GPS antenna using a microstrip antenna element having right hand circular polarization for receiving a GPS satellite signal having GPS location determination information, a radio frequency antenna using either a rod or a wire loop for receiving a radio signal in the FM broadcast frequency range, an enclosure, and an output cable. A preferred embodiment of a GPS/DGPS receiver system includes the GPS/radio antenna, an FM DGPS receiver for demodulating a DGPS radio signal and providing DGPS corrections, and a differential-ready GPS receiver for correcting the GPS location determination information according to the DGPS corrections and providing the DGPS location.

An advantage of the present invention is that the GPS/radio antenna is convenient for a mobile application, low cost, and provides for a clear reception path for a radio signal by combining a GPS antenna and a radio antenna in a signal package using a single output cable.

Another advantage of the present invention is that the GPS/radio antenna may receive a DGPS radio signal from an FM station broadcasting DGPS corrections in the frequency range of about 88 to 108 MHz.

Another advantage of the present invention is that the GPS/radio antenna may receive a circularly polarized GPS signal that is less susceptible to multipath for providing better DGPS location accuracy.

Another advantage of the present invention is that the GPS/DGPS receiver system uses the GPS/radio antenna having a single package and a single cable for providing the DGPS location to a user.

These and other objects of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
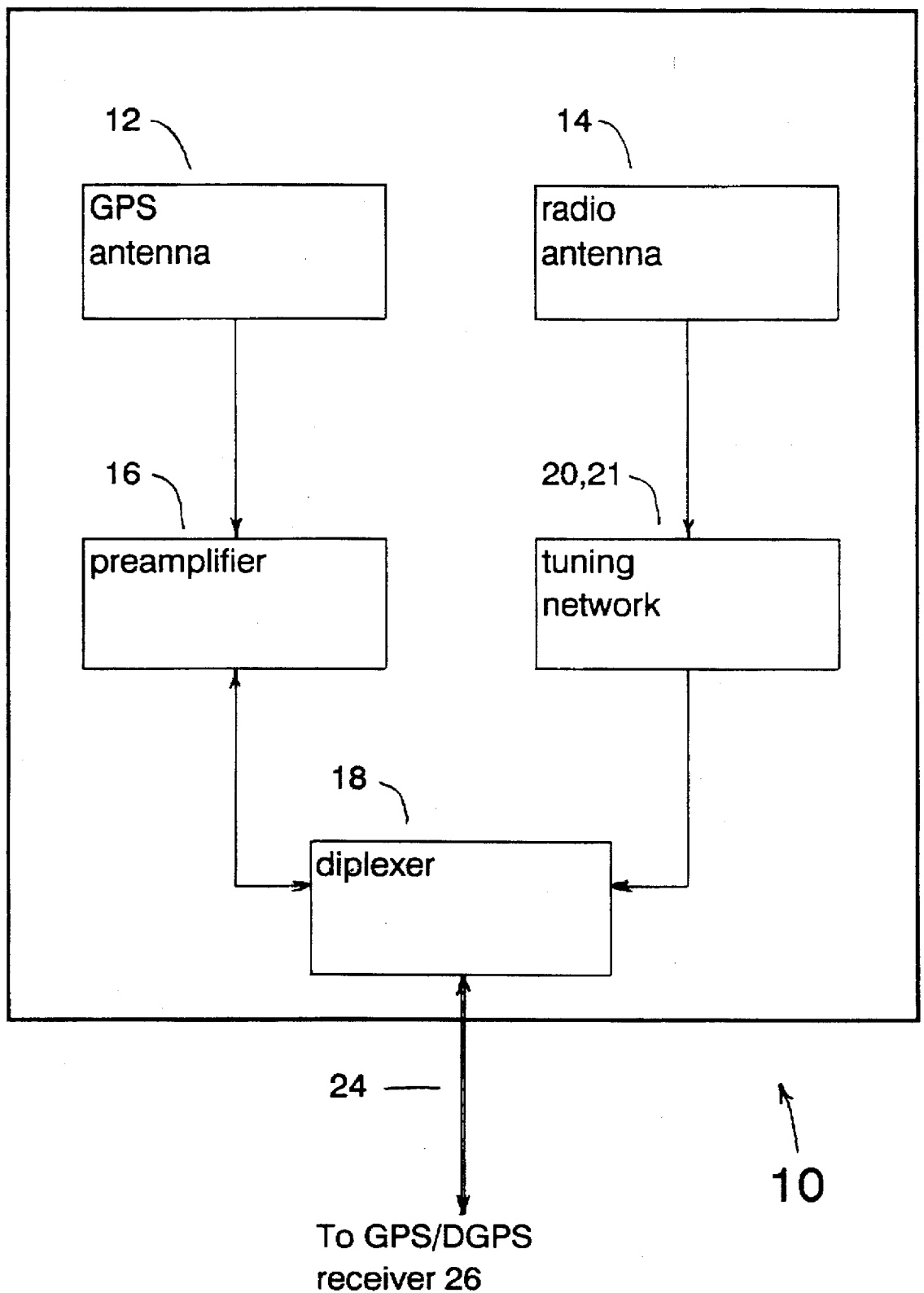
FIG. 1 is a block diagram of a Global Positioning System (GPS)/radio antenna of the present invention.

FIG. 1 illustrates a block diagram of a GPS/radio antenna of the present invention referred to herein by the general reference number 10. The GPS/radio antenna 10 includes a GPS antenna 12 and a radio antenna 14. The GPS antenna 12 receives GPS satellite signals having GPS location determination information from one or more GPS satellites and issues a conducted GPS signal to a preamplifier 16. The conducted GPS signal includes the GPS location determination information and has the same frequency as the GPS satellite signals that are received. The preamplifier 16 matches the impedance of the GPS antenna 12, amplifies the conducted GPS signal, and issues an amplified GPS signal to a first input of a diplexer 18. The radio antenna 14 receives an airwave radio signal from a radio signal broadcaster and issues a conducted radio signal, having the same frequency and the same information as the airwave signal, to a tuning network 20 or 21. The tuning network 20, 21 and the radio antenna 14 cooperate to tune the antenna 14 to resonate at the frequencies of the airwave radio signal and issue a radio antenna signal to a second input of the diplexer 18. The diplexer 18 superimposes the amplified GPS signal and the radio antenna signal into a combination signal and issues the combination signal to a coaxial output cable 24. The diplexer 18 is constructed with inductors and capacitors using conventional techniques that are well known to radio frequency circuit design engineers. The output cable 24, including an inner conductor 25 shown in FIGS. 3, 4, and 5, passes the combination signal to a GPS/DGPS receiver 26. The GPS/DGPS receiver 26 provides operating power to the GPS/radio antenna 10 through the inner conductor 25 of the output cable 24. The diplexer 18 passes the operating power to the preamplifier 16. The gain of the preamplifier 16 has a range of zero to forty five dB depending upon the attenuation of the output cable 24 at the 1.575 GHz of the GPS signal and the signal-to-noise tolerance of the GPS/DGPS receiver 26. The preamplifier 16 may be eliminated when zero gain is required and the first input of the diplexer 18 is designed to match the impedance of the GPS antenna 12.

In a preferred embodiment, the radio antenna 14 receives an FM radio broadcast signal in a frequency range of 88 to 108 MHz, including differential GPS (DGPS) corrections on a subcarrier of the signal. Such signals, termed DGPS radio signals, are broadcast from various FM radio stations. Technical information for the DGPS radio signals is available in RDS, RADIO DATA SYSTEM, THE ENGINEERING CONCEPT, 2nd Edition, published February 1990 by the British Broadcasting System Engineering Training Department, Technical Publications Unit, at Wood Norton, Evesham Worcestershire, WR11 4TF. Commercial price and availability as well as the technical information can be obtained from Differential Corrections Incorporated of Cupertino, Calif.

Figure 2A:
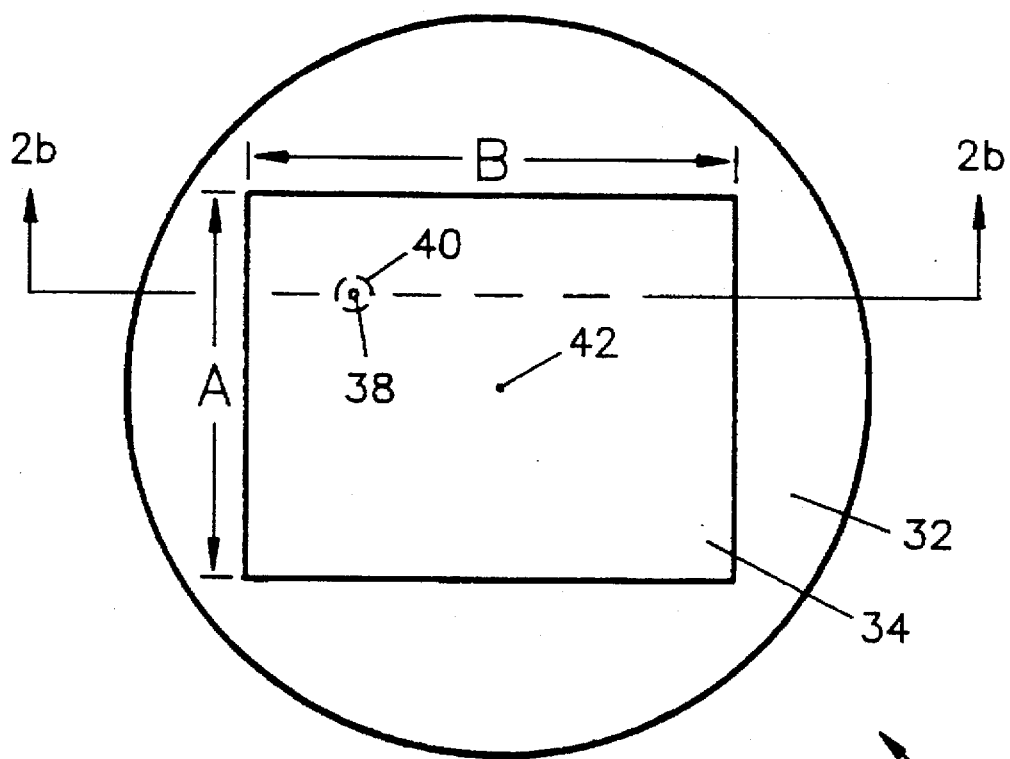
FIGS. 2a and 2b are a top view and a side section view, respectively, of a microstrip antenna element of the GPS/radio antenna of FIG. 1.
Figure 2B:
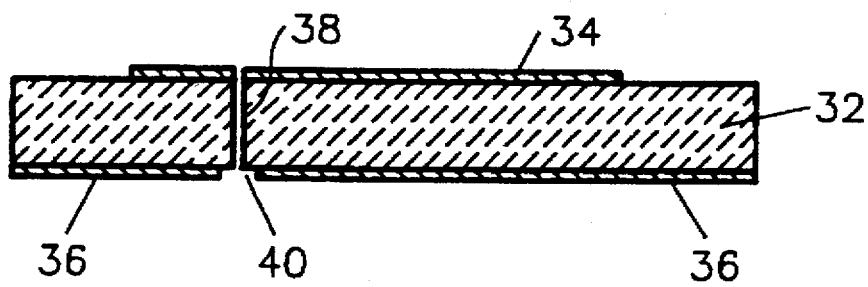

FIGS. 2a and 2b illustrate a top view and a side section view, respectively, of a microstrip antenna element of the present invention referred to herein by the general reference number 30 and used for the receiving element in the GPS antenna 12. The microstrip antenna element 30 includes a dielectric substrate 32, a metal radiating layer 34 having a rectangular shape of shorter dimension A and longer dimension B on the top side of the substrate 32, a metal ground layer 36 covering the bottom side of the substrate 32, and an electrically conductive via 38 passing through the substrate 32 and through an aperture 40 in the ground layer 36 to connect the radiating layer 34 to the preamplifier 16. The design for the A and B dimensions, the location of the via 38 in relation to the A and B dimensions, and the dielectric constant, diameter and/or area, and thickness of the substrate 32 are critical to the impedance, polarization pattern, and resonant frequency of the microstrip antenna element 30. Equations and descriptions for such design having right hand circular polarization are included in U.S. Pat. No. 3,984,834 by Kaloi issued Oct. 5, 1976 and U.S. Pat. No. 5,272,485 by Mason et al. which are incorporated herein by reference. It is an inherent characteristic of the microstrip antenna element 30 that its performance is largely unaffected by conductive or dielectric material placed on or near the center vertical axis 42. Several companies including Trans-Tech Inc., a subsidiary of Alpha Industries, located in Adamstown, Md. and MicroPulse Inc. located in Camarillo, Calif. have the commercial capability of fabricating the microstrip antenna element 30 of various materials in various sizes and shapes according to the engineering specifications for such design.

Figure 3:
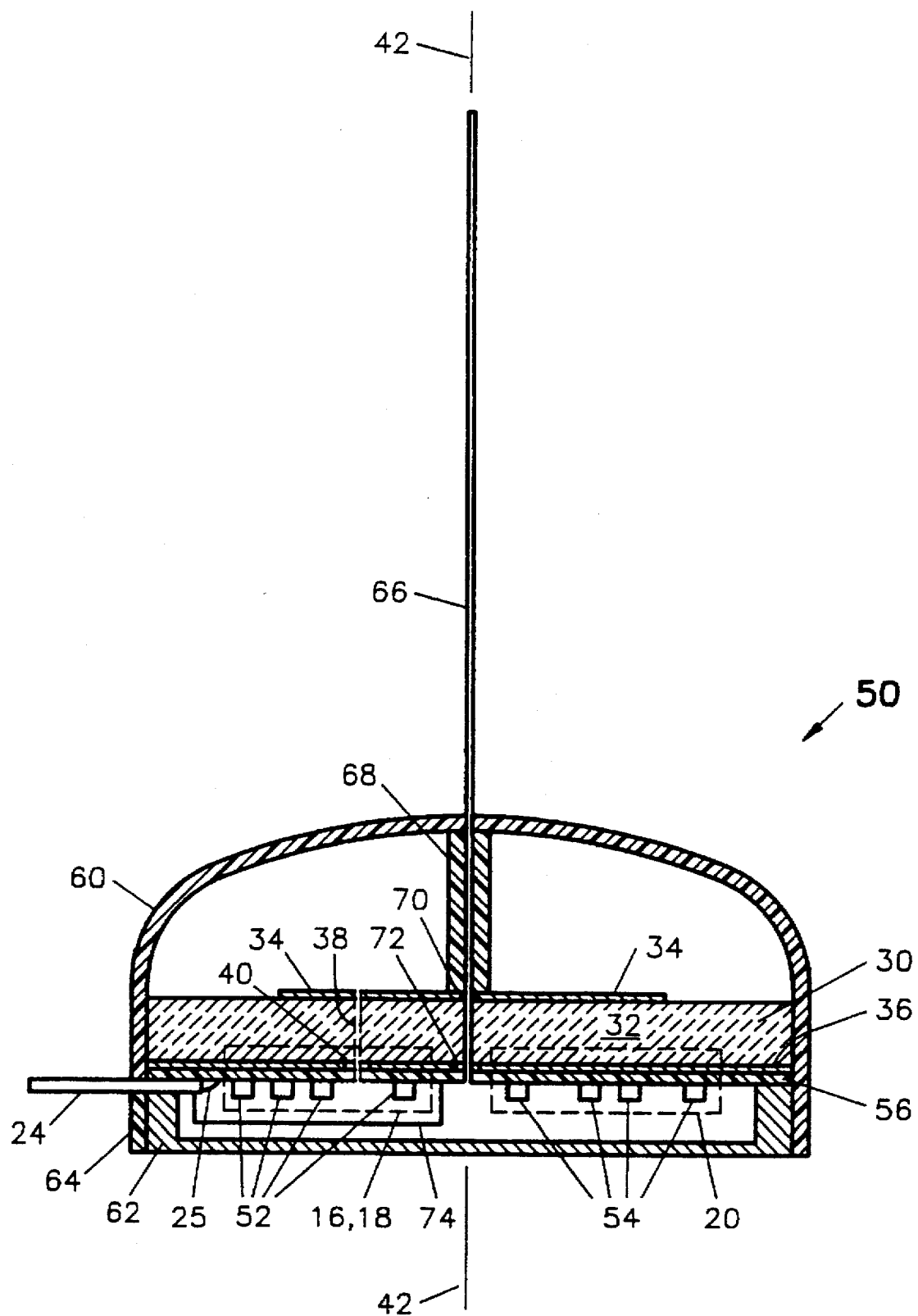
FIG. 3 is a side sectional view of a first embodiment of the GPS/radio antenna of FIG. 1.

FIG. 3 illustrates a side sectional view of a first embodiment of the GPS/radio antenna 10 of the present invention referred to herein by the general reference number 50. A plurality of electrical components 52 representing the components for the preamplifier 16 and the diplexer 18 and a plurality of electrical components 54 representing the components for the tuning network 20 mount to the bottom side of a printed circuit board 56. The top side of the printed circuit board 56 is covered by a ground plane that is in electrical contact with the ground layer 36.

A plastic radome 60 about one and one-half to four centimeters high and four to eight centimeters in diameter and an electrically conductive base 62 about three and one-half to seven and one-half centimeters in diameter enclose the microstrip antenna element 30, the printed circuit board 56, and the electrical components 52 and 54. The output cable 24 passes from the output of the diplexer 18 through an aperture in the base 62 and a slot in the radome 60. The slot in the radome 60 is open to the bottom edge of the radome 60 to allow the cable 24, the radome 60, and the base 62 to be assembled. After the output cable 24, radome 60, and base 62 have been assembled, a filler 64 is used to fill the open slot. Both the inner conductor 25 and outer conductor of the output cable 24 are connected into the diplexer 18 in order to minimize conducted ground voltages at the GPS frequency. The top and bottom of the printed circuit board 56 are electrically connected at the outside edge either with many closely spaced vias or a conductive material wrapped around the edge so that the base 62 and the ground layer 36 and/or the ground plane of the printed circuit board 56 form an electrically isolated enclosure. The outer conductor of the output cable 24 is electrically connected to the base 62. The radome 60, base 62, and filler 64 may be held together with glue or with gaskets and fastenings.

The GPS/radio antenna 50 receives the airwave radio signal with a slender electrically conductive rod 66 located on the center vertical axis 42 of the microstrip antenna element 30 and electrically connected to the tuning network 20. The rod 66 projects upward through the substrate 32, through a plastic spacer 68, and through an aperture at the apex of the radome 60 and projects upwardly into space. Apertures 70 and 72 electrically isolate the rod 66 from the radiating layer 34 and the ground layer 36, respectively. An aperture in the ground plane on the printed circuit board 56 isolates the rod 66 from the ground plane. During and after the assembly, the spacer 68 forces the base 62 into electrical contact with the ground layer 36. Conductive gasket material may be required to compensate for dimensional tolerances of the substrate 32, radome 60, base 62, printed circuit board 56, and spacer 68. The rod 66 may be stiff or flexible.

A shielding box 74 covering the electrical components 52 mounts to the printed circuit board 56 to prevent the amplified GPS signal from radiating from the components 52 to the components 54, being conducted from the components 54 to the rod 66, and then being re-radiated to the microstrip antenna element 30. The shielding box 74 is electrically connected to the ground plane on the top side of the printed circuit board 56 by many closely spaced vias and to the outer conductor of the output cable 24. The length of the electrical connections between the tuning network 20 and the diplexer 18 is as short as possible outside the shielding box 74. Alternatively, a shielding box may be used to cover the components 54. If the gain of the preamplifier 16 is required to be greater than about thirty dB, both the shielding box 74 and the shielding box covering components 54 may be required.

For receiving the DGPS radio signal, the rod 66 may have a length of approximately ¾ meter for resonance in the 88 to 108 MHz frequency range. However, in a preferred embodiment, the rod 66 has a length in a range of ten to twenty centimeters and is tuned to resonance with the tuning network 20. Techniques and constructions tuning a short rod antenna for resonance in a desired frequency range are well-known to engineers skilled in the antenna art. Typically, a Smith Chart display and a Network Analyzer are used to choose and test a configuration and values of capacitors and inductors for the tuning network 20 to transform a complex impedance of the antenna at the selected frequency to a desired impedance. One source of information for such techniques is the ARRL ANTENNA BOOK, published by the American Radio Relay League, Inc, in Newington, Conn. in 1974. In a preferred embodiment, the tuning network 20 includes a series inductor that is adjusted to resonate with the capacitance of the rod 66 at the selected frequency. Additional components may be included in the tuning network 20 for a broader frequency range, a more desirable impedance, or better frequency repeatability.

Figure 4:
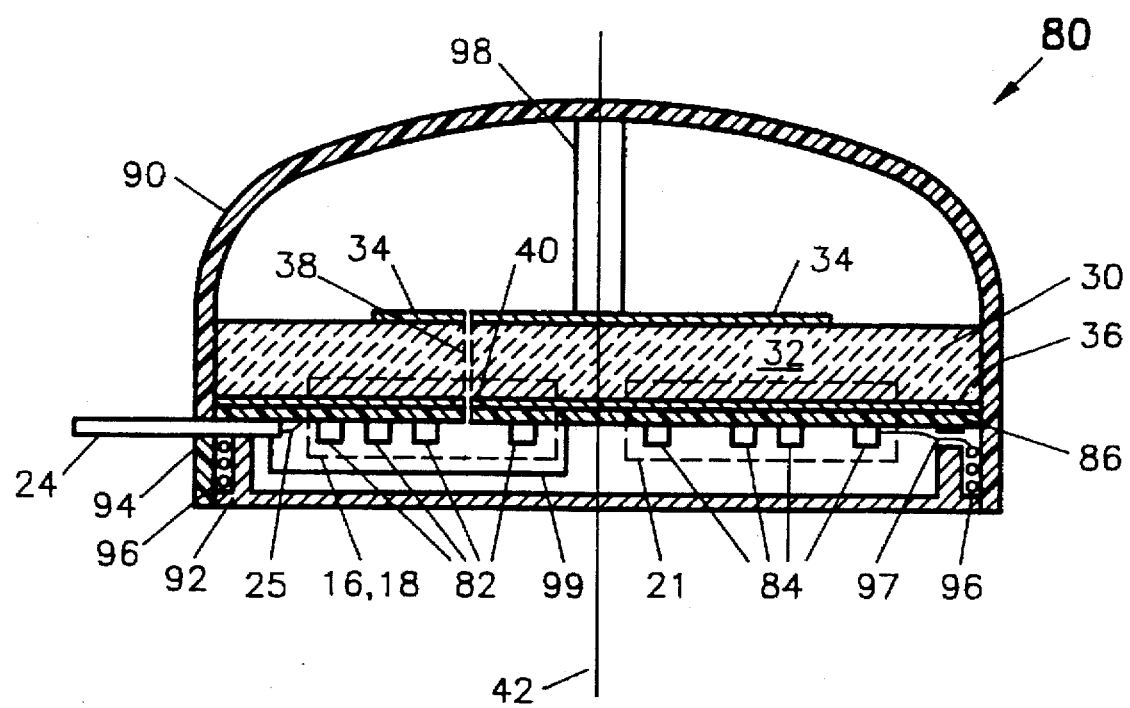
FIG. 4 is a side sectional view of a second embodiment of the GPS/radio antenna of FIG. 1.

FIG. 4 illustrates a side section view of a second embodiment of the GPS/radio antenna 10 of the present invention referred to herein by the general reference number 80. A plurality of electrical components 82 representing the components for the preamplifier 16 and the diplexer 18 and a plurality of electrical components 84 representing the components for the tuning network 21 mount to the bottom side of a printed circuit board 86. The top side of the printed circuit board 86 is covered by a ground plane that is in electrical contact with the ground layer 36.

A plastic radome 90 one and one half to four centimeters high and four to eight centimeters in diameter and an electrically conductive base 92 about three and one half to seven and one half centimeters in diameter enclose the microstrip antenna element 30, the printed circuit board 86, and the electrical components 82 and 84. The output cable 24 passes from the output of the diplexer 18 through an aperture in the base 92 and a slot in the radome 90. The slot in the radome 90 is open to the bottom edge of the radome 90 to allow the cable 24, the radome 90, and the base 92 to be assembled. After the output cable 24, radome 90, and base 92 have been assembled, a filler 94 is used to fill the open slot. Both the inner conductor 25 and outer conductor of the output cable 24 are connected into the diplexer 18 in order to minimize conducted ground voltages at the GPS frequency. The top and bottom of the printed circuit board 86 are electrically connected at the outside edge either with many closely spaced vias or a conduction material wrapping about the edge so that the base 92 and the ground layer 36 and/or the ground plane of the printed circuit board 86 form an electrically isolated enclosure. The radome 90, base 92, and filler 94 may be held together with glue or with gaskets and fastenings.

The GPS/radio antenna 80 receives the radio signal with a continuous insulated wire loop 96 forming at least a partial loop and preferably more than one loop about the outside edge of the base 92. The ends of the wire loop 96 pass through a small aperture 97 in the base 92 to connect to the electrical components 84 for the tuning network 21. During and after assembly, a plastic spacer 98 located on the center vertical axis 42 of the microstrip antenna element 30 forces the base 92 into electrical contact with the ground layer 36. Conductive gasketing material may be required to compensate for dimensional tolerances of the substrate 32, radome 90, base 92, printed circuit board 86, and spacer 98.

A shielding box 99 covering the electrical components 82 mounts to the printed circuit board 86 to prevent the amplified GPS signal from radiating from the components 82 to the components 84, being conducted from the components 84 to the wire loop 96, and then being re-radiated to the microstrip antenna element 30. The shielding box 99 is electrically connected to the ground plane on the printed circuit board 86 by many closely spaced vias and to the outer conductor of the output cable 24. The length of the electrical connection between the tuning network 21 and the diplexer 18 is as short as possible outside the shielding box 99. Alternatively, a shielding box may be used to cover the components 84. If the gain of the preamplifier 16 is required to be greater than about thirty dB, both the shielding box 99 and the shielding box covering components 84 may be required.

For receiving the DGPS radio signal, the wire loop 96 is tuned to resonance in the frequency range of 88 to 108 MHz with the tuning network 21. The techniques for tuning a wire loop for resonance in a desired frequency range are conventional and well-known to antenna engineers. Typically, an engineer uses a Smith Chart display and a Network Analyzer to choose and test configuration and values of capacitors and inductors to transform a complex impedance of the antenna at the selected frequency to a desired impedance. In a preferred embodiment, the tuning network 21 includes a first capacitor connected in parallel to the wire loop 96 and a second capacitor connected in series with the parallel combination. The capacitors are adjusted to resonate with the wire loop 96 at the desired frequency. Either or both of the capacitors may be varactor diodes to enable the tuning network 21 to be tuned electronically to a precise frequency. Additional components may be included in the tuning network 21 for a broader frequency range, a more desirable impedance, or better frequency repeatability.

Figure 5:
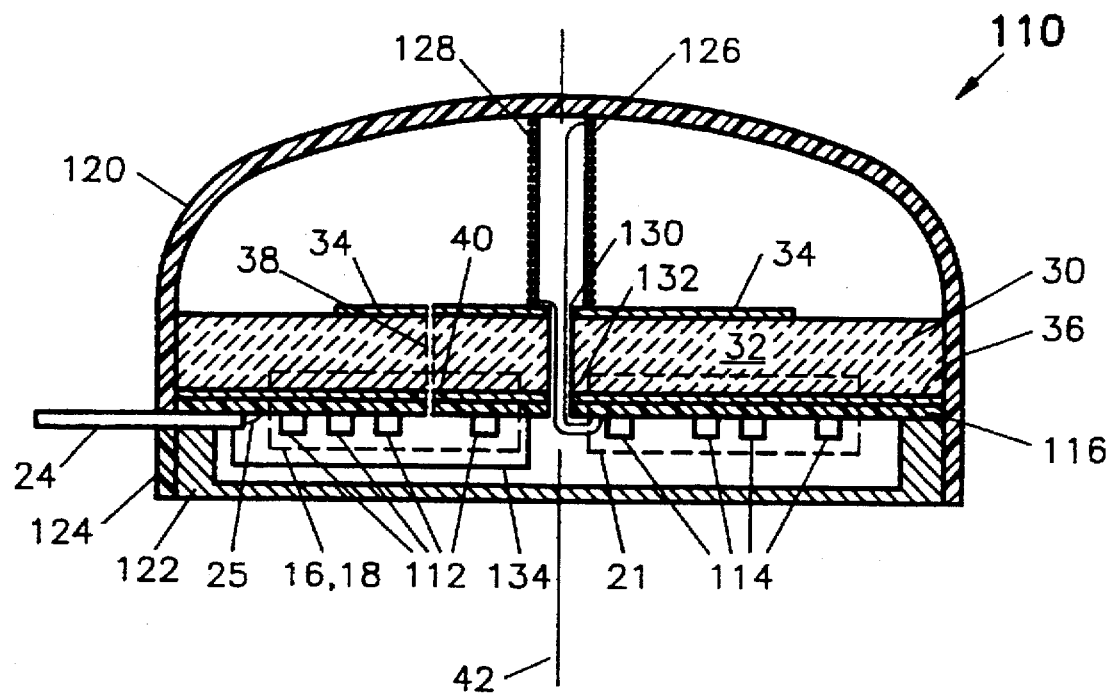
FIG. 5 is a side sectional view of a third embodiment of the GPS/radio antenna of FIG. 1.

FIG. 5 illustrates a side section view of a third embodiment of the GPS/radio antenna 10 of the present invention referred to herein by the general reference number 110. A plurality of electrical components 112 representing the components for the preamplifier 16 and the diplexer 18 and a plurality of electrical components 114 representing the components for the tuning network 21 mount to the bottom side of the printed circuit board 116. The top side of the printed circuit board 116 is covered by a ground plane that is in electrical contact with the ground layer 36.

A plastic radome 120 one and one half to four centimeters high and four to eight centimeters in diameter and an electrically conductive base 122 about three and one half to seven and one half centimeters in diameter enclose the microstrip antenna element 30, the printed circuit board 116, and the electrical components 112 and 114. The output cable 24 passes from the output of the diplexer 18 through an aperture in the base 122 and a slot in the radome 120. The slot in the radome 120 is open to the bottom edge of the radome 120 to allow the cable 24, the radome 120, and the base 122 to be assembled. After the output cable 24, radome 120, and base 122 have been assembled, a filler 124 is used to fill the open slot. Both the inner conductor 25 and outer conductor of the output cable 24 are connected into the diplexer 18 in order to minimize conducted ground voltages at the GPS frequency. The top and bottom of the printed circuit board 116 are electrically connected at the outside edge either with many closely spaced vias or a conductive material wrapping about the edge so that the base 122 and the ground layer 36 and/or the ground plane of the printed circuit board 116 form an electrically isolated enclosure. The radome 120, base 122, and filler 124 may be held together with glue or with gaskets and fastenings.

The GPS/radio antenna 110 receives the radio signal with a continuous, insulated wire loop 126 having many turns about a cylindrical spacer/core 128 located on the center vertical axis 42 of the microstrip antenna element 30. During and after assembly, the spacer/core 128 forces the base 122 into electrical contact with the ground layer 36. Conductive gasketing material may be required to compensate for dimensional tolerances of the substrate 32, radome 120, base 122, printed circuit board 116, and spacer/core 128. The ends of the wire loop 126 pass through an aperture 130 in the radiating layer 34, through an aperture or a pair of vias in the substrate 32, through an aperture 132 in the ground layer 36, and through an aperture in the ground plane of the printed circuit board 116 to connect to the electrical components 114 for the tuning network 21. The upper end of the wire loop 126 may be routed downward to the aperture 130 either along the outside of the wire loop 126 or through an aperture in the spacer/core 128. The spacer/core 128 may be made of a plastic or a ferrite material.

A shielding box 134 covering the electrical components 112 mounts to the printed circuit board 116 to prevent the amplified GPS signal from radiating from the components 112 to the components 114, being conducted from the components 114 to the wire loop 126, and then being re-radiated to the microstrip antenna element 30. The shielding box 134 is electrically connected to the ground plane on the top side of the printed circuit board 116 by many closely spaced vias and to the outer conductor of the output cable 24. The length of the electrical connection between the tuning network 21 and the diplexer 18 is as short as possible outside the shielding box 134. Alternatively, a shielding box may be used to cover the components 114. If the gain of the preamplifier 16 is required to be greater than about thirty dB, both the shielding box 134 and the shielding box covering components 114 may be required.

For receiving the DGPS radio signal, the wire loop 126 is tuned to resonance in the frequency range of 88 to 108 MHz with the tuning network 21. The techniques for tuning a wire loop for resonance in a desired frequency range are conventional and well-known to antenna engineers. Typically, an engineer uses a Smith Chart display and a Network Analyzer to choose and test a configuration and values of capacitors and inductors to transform a complex impedance of the antenna at the selected frequency to a desired impedance. In a preferred embodiment, the tuning network 21 includes a first capacitor connected in parallel to the wire loop 126 and a second capacitor connected in series with the parallel combination. The capacitors are adjusted to resonate with the wire loop 126 at the desired frequency. Either or both capacitors may be varactor diodes to enable the tuning network 21 to be electronically tuned to a precise frequency. Additional components may be included in the tuning network 21 for a broader frequency range, a more desirable impedance, or better frequency repeatability.

Figure 6:
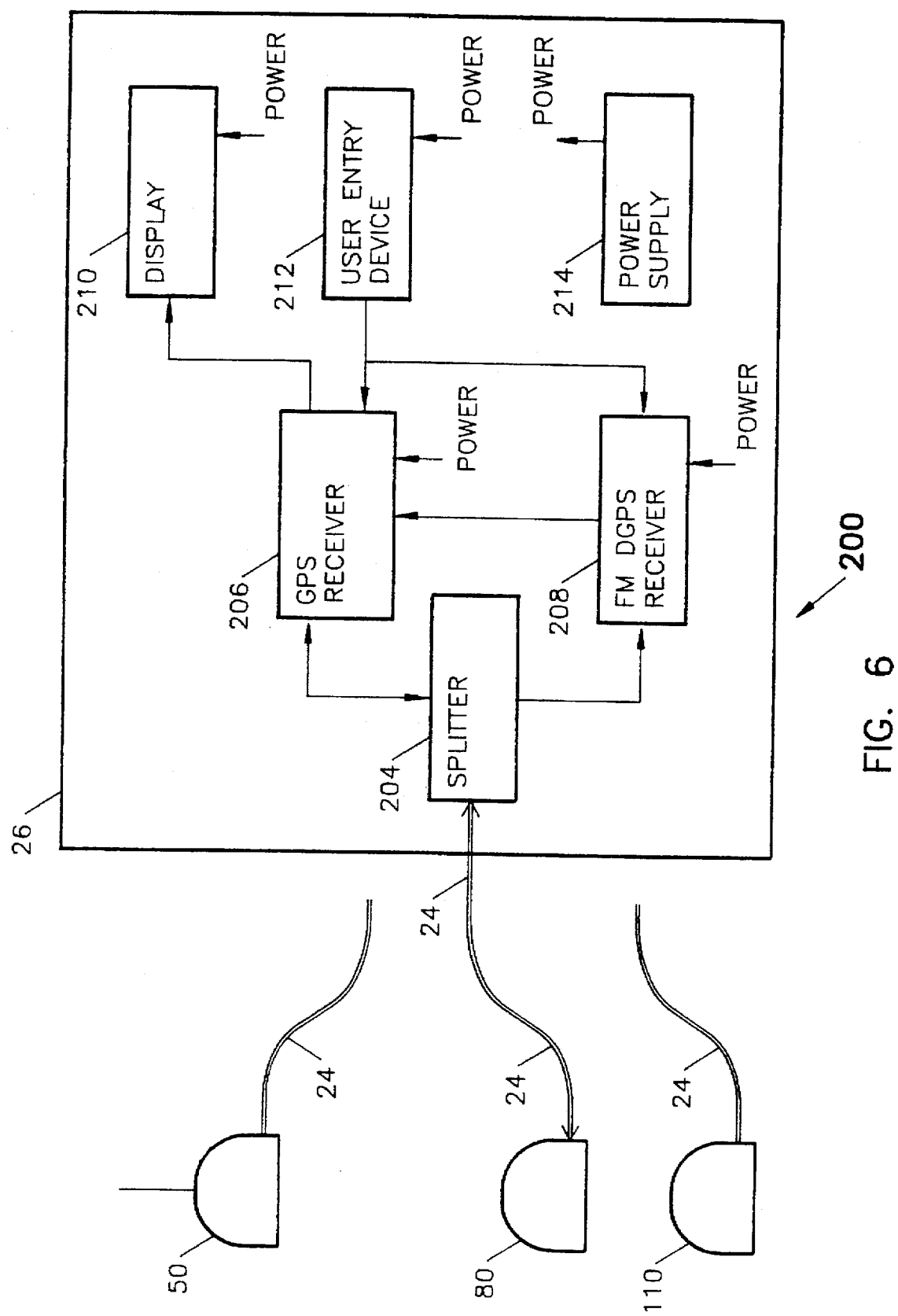
FIG. 6 is a block diagram of a GPS/DGPS receiver system using the GPS/radio antenna of FIG. 1 for displaying a differentially-corrected GPS (DGPS) location.

FIG. 6 illustrates a block diagram of a GPS/DGPS receiver system of the present invention referred to herein by the general reference number 200 and including the GPS/radio antenna 50, 80, or 110 tuned for receiving GPS satellite signals and DGPS radio signals and the GPS/DGPS receiver 26 for providing the differentially-corrected GPS (DGPS) location. The GPS/radio antenna 50, 80, 110 is connected to the GPS/DGPS receiver 26 through the output cable 24. The GPS/DGPS receiver 26 includes a splitter 204 having an input and first and second outputs. The splitter 204 receives the combined signal at the input and splits the combined signal to issue a conducted GPS signal at the first output and a conducted DGPS radio signal at the second output. A differential-ready GPS receiver 206 receives the GPS signal and an FM DGPS receiver 208 receives the DGPS radio signal. The FM DGPS receiver 208 demodulates the DGPS radio signal and the subcarrier and provides a DGPS data signal including the DGPS corrections to the GPS receiver 206. The FM DGPS receiver 208 is commercially available from Differential Corrections Incorporated of Cupertino, Calif. The GPS receiver 206 processes the GPS location determination information in the GPS signal and the DGPS corrections in the DGPS data signal to provide the DGPS location of the GPS/radio antenna 50, 80, 110 and supplies operating power to the GPS/radio antenna 50, 80, 110 through the splitter 204 and the inner conductor 25 of the output cable 24. The GPS receiver 206 is commercially available on a printed circuit board from Trimble Navigation Limited of Sunnyvale, Calif. as a model "SVeeSix"; from Motorola Corporation Incorporated having offices in most major cities as an "ONCORE"; or from Rockwell International Corporation of Newport Beach, Calif. as a model "NavCore MicroTracker." The GPS receiver 206 issues the DGPS location in an output signal to a display 210. The display 210 includes a liquid crystal display (LCD) to visually display the GPS location to a user. A user entry device 212 receives user requests from the user and passes the requests to the GPS receiver 206 and the FM receiver 208 in a user entry signal. A power supply 214 supplies operating power to the GPS receiver 206, the FM receiver 208, the display 210, and the user entry device 212.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An antenna combination comprising:

microstrip means for receiving a GPS satellite signal including GPS location determination information and issuing a conducted GPS signal representative of said GPS satellite signal;

radio antenna means for receiving an airwave radio signal having a frequency band within a frequency range of 80 to 1900 MHz from a radio signal broadcaster and issuing a conducted radio signal representative of said airwave radio signal;

a diplexer, coupled to the microstrip means and the radiowave antenna means, for combining said conducted GPS signal and said conducted radio signal and issuing a combined signal; and an output cable, coupled to the diplexer, for providing said combined signal as an output.

2. A method for receiving a GPS satellite signal and an airwave radio signal comprising steps of:

receiving a GPS satellite signal with a microstrip antenna;

issuing a conducted GPS signal representative of said GPS satellite signal from said microstrip antenna to a diplexer;

receiving an airwave radio signal having a frequency band within a frequency range of 80 to 1900 MHz with a radio antenna;

issuing a conducted radio signal representative of said airwave radio signal to said diplexer;

combining said conducted GPS signal and said conducted radio signal into a combined signal in said diplexer; and issuing said combined signal through an output cable.

3. An antenna combination, comprising:

a microstrip antenna, including a vertical center axis, for receiving a first airwave signal and issuing a first conducted signal representative of said first airwave signal;

a radio antenna, including a rod extending upward from said microstrip antenna approximately on said center axis, for receiving a second airwave signal and issuing a second conducted signal representative of said second airwave signal; and a diplexer coupled to the microstrip antenna and the radio antenna for combining said first conducted signal with said second conducted signal and issuing a combined signal representative of said first and said second conducted signals.

4. The antenna combination of claim 3, wherein:

said first airwave signal is a global position system (GPS) signal including GPS location determination information.

5. The antenna combination of claim 3, wherein:

the radio antenna is tuned for receiving said second airwave signal having a frequency band within a frequency range of 80 to 1900 MHz.

6. The antenna combination of claim 3, wherein:

the radio antenna is further for receiving said second conducted signal and transmitting said second airwave signal.

7. An antenna combination, comprising:

a microstrip antenna, including a radiating layer having a vertical center axis, for receiving a first airwave signal and issuing a first conducted signal representative of said first airwave signal;

a radio antenna, including a wire loop having a loop center axis approximately concentric with said vertical center axis and a circumference of less than one quarter a circumference of said radiating layer, disposed above said microstrip antenna for receiving a second airwave signal and issuing a second conducted signal representative of said second airwave signal; and a diplexer coupled to the microstrip antenna and the radio antenna for receiving said first conducted signal and said second conducted signal and issuing a combined signal representative of said first and said second conducted signals.

8. The antenna combination of claim 7, wherein:

said first airwave signal is a global position system (GPS) signal including GPS location determination information.

9. The antenna combination of claim 7, wherein:

the radio antenna is tuned for receiving said airwave radio signal having a frequency band within a frequency range of 80 to 1900 MHz.

10. The antenna combination of claim 7, wherein:

the radio antenna is further for receiving said second conducted signal and transmitting said second airwave signal.

11. An antenna combination comprising:

a microstrip antenna, including a radiating layer having a vertical center axis, for receiving a first airwave signal and issuing a first conducted signal representative of said first airwave signal;

a radio antenna, including a wire loop having a loop center axis approximately concentric with said vertical center axis, disposed below said microstrip antenna, for receiving a second airwave signal and issuing a second conducted signal representative of said second airwave signal; and a diplexer coupled to the microstrip antenna and the radio antenna for receiving said first conducted signal and said second conducted signal and issuing a combined signal representative of said first and said second conducted signals.

12. The antenna combination of claim 11, wherein:

said first airwave signal is a global positioning system (GPS) signal having information for determining a geographical location.

13. The antenna combination of claim 11, wherein:

said second airwave signal is a differential global positioning system (DGPS) signal having information for correcting a geographical location determined from the global positioning system.

* * * * *